(12) United States Patent
Hasegawa et al.

(10) Patent No.: US 6,911,482 B2
(45) Date of Patent: Jun. 28, 2005

(54) ION EXCHANGE FLUOROCARBON RESIN PRECURSOR COMPOSITION

(75) Inventors: Takuya Hasegawa, Yokohama (JP); Yoshimichi Nakayama, Nobeoka (JP)

(73) Assignee: Asahi Kasei Kabushiki Kaisha, Oaska (JP)

( * ) Notice: Subject to any disclaimer, the term of this patent is extended or adjusted under 35 U.S.C. 154(b) by 0 days.

(21) Appl. No.: 10/467,281

(22) PCT Filed: Feb. 13, 2002

(86) PCT No.: PCT/JP02/01197

§ 371 (c)(1),
(2), (4) Date: Aug. 6, 2003

(87) PCT Pub. No.: WO02/072694

PCT Pub. Date: Sep. 19, 2002

(65) Prior Publication Data

US 2004/0067401 A1 Apr. 8, 2004

(30) Foreign Application Priority Data

Feb. 13, 2001 (JP) ........................ 2001-034859

(51) Int. Cl.⁷ ................................. C08J 5/20
(52) U.S. Cl. ................ 521/27; 521/28; 524/104; 524/251; 524/354; 524/356; 524/376; 524/379; 524/389; 524/544; 526/245; 526/250; 526/255
(58) Field of Search ............... 521/27, 28; 524/104, 524/251, 354, 356, 376, 379, 389, 544; 526/245, 250, 255

(56) References Cited

U.S. PATENT DOCUMENTS

| | | | | |
|---|---|---|---|---|
| 4,259,226 A | * | 3/1981 | Suhara et al. | 524/379 |
| 4,341,685 A | * | 7/1982 | Miyake et al. | 524/104 |
| 5,608,022 A | * | 3/1997 | Nakayama et al. | 526/212 |
| 5,820,984 A | * | 10/1998 | Blankenbeckler et al. | 428/393 |
| 6,025,441 A | * | 2/2000 | Koshirai et al. | 525/199 |

FOREIGN PATENT DOCUMENTS

| | | |
|---|---|---|
| JP | 53-149881 | 12/1978 |
| JP | 54-107949 A | 8/1979 |
| JP | 55-149336 A | 11/1980 |
| JP | 56-81342 A | 7/1981 |
| JP | 57-115425 A | 7/1982 |
| JP | 61-16288 B2 | 4/1986 |
| JP | 63-61337 B2 | 11/1988 |
| JP | 8-325335 A | 12/1996 |
| JP | 2001-29800 A | 2/2001 |

* cited by examiner

*Primary Examiner*—Tatyana Zalukaeva
(74) *Attorney, Agent, or Firm*—Birch, Stewart, Kolasch, & Birch, LLP

(57) ABSTRACT

An ion exchange fluorocarbon resin precursor composition obtained by removing liquid components from a mixed solution of a dispersion of an ion exchange fluorocarbon resin precursor and a dispersion of tetrafluoroethylene polymer (PTFE).

13 Claims, 2 Drawing Sheets

ION EXCHANGE FLUOROCARBON RESIN PRECURSOR COMPOSITION

This application is the national phase under 35 U.S.C. § 371 of PCT International Application No. PCT/JP02/01197 which has an International filing date of Feb. 13, 2002, which designated the United States of America.

TECHNICAL FIELD

The present invention relates to a method for manufacturing an ion exchange fluorocarbon resin membrane used as an electrolyte and a diaphragm of a solid polyelectrolyte type of fuel cell, in particular a method for manufacturing an intermediate raw material or a precursor composition of an ion exchange fluorocarbon resin membrane having an excellent performance as an electrolyte and a diaphragm.

BACKGROUND ART

A fuel cell is a sort of electric generator which generates electric energy by electrochemically oxidizing fuels such as hydrogen and methanol and has lately attracted attention as a clean energy source. The fuel cell is classified into: a phosphoric acid type, a molten carbonate type, a solid oxide type, a solid polyelectrolyte type or the like depending on the kind of electrolyte used. Among these the solid polyelectrolyte type of fuel cell is expected to be widely applied as a power source for electric vehicles or the like because of the low standard operating temperature of 100° C. or less and the high energy thereof.

The solid polyelectrolyte type of fuel cell is basically composed of an ion exchange membrane and a pair of gas diffusion electrodes bonded to both sides thereof. It generates electricity by supplying hydrogen to one electrode and oxygen to the other electrode and connecting both electrodes to an external load circuit. More specifically, a proton and an electron are generated in the hydrogen side electrode. The proton migrates through the ion exchange membrane to the oxygen side electrode, and then reacts with oxygen to form water, while the electron flows through a lead wire from the hydrogen side electrode and discharges electric energy in the external load circuit and then arrives at the oxygen side electrode through another lead wire, contributing to the above water-forming reaction. Although required characteristics of the ion exchange membrane is high ion conductivity in the first place, high water content and high water dispersibility in addition to the ion conductivity are also important required characteristics because the proton is considered to be stabilized by hydration of a water molecule when migrating through the ion exchange membrane. In addition, since the ion exchange membrane also functions as a barrier to prevent direct reaction of hydrogen and oxygen, low gas permeability is required. Furthermore, the properties such as chemical stability to resist a strongly acidic atmosphere during the fuel cell operation and mechanical strength to meet the requirements for thinner membrane are also necessary.

An ion exchange fluorocarbon resin is widely employed as a material for the ion exchange membrane to be used for the solid polyelectrolyte type of fuel cell, because of its high chemical stability. Particularly "Nafion(registered trademark)" made by DuPont Co. having a perfluorocarbon as a main chain and a sulfonic acid group at an end of a side chain is widely used. Although such ion exchange fluorocarbon resin generally has well-balanced properties as a solid polyelectrolyte material, further improvements in the properties thereof have been required to advance the practical use of said fuel cells.

With regard to the long term durability of fuel cell, for instance, a participation of mechanical strength in a high temperature and a high humidity state is suggested as a factor thereof. Several methods to improve the mechanical strength of the ion exchange membrane have been conventionally proposed, and as an example, JP-A-53-149881 discloses "A reinforced cation exchange resin characterized in that a fibrillated tetrafluoroethylene polymer is contained in a cation exchange resin forming a cation exchange resin membrane". The production method described in said application is characterized by mixing a) an ion exchange resin precursor or a swollen material thereof with trichlorotrifluoroethane, and b) fine powder or an emulsified aqueous dispersion of a tetrafluoroethylene polymer (hereinafter, referred to as PTFE) obtained by an emulsion polymerization or a suspension polymerization, then melt kneading them to obtain a composition. However, according to said production method, a uniform dispersion of PTFE is practically difficult, and results in some problems causing a very poor quality of sheet, such as PTFE agglomerate formed inside the membrane and an uneven surface formed on the sheet in an extrusion sheet molding. This is not only a problem of the quality of sheet surface, but also suggests an essential problem involved in the conventional technology that a certain amount of the added PTFE remains inside the PTFE agglomerate to be wasted without being fibrillated.

In addition, JP-B-63-61337 discloses "A method for making thinner a membrane consisting of a fluorine-containing ion exchange resin containing an uniformly dispersed fibrillated fluorocarbon resin fiber by stretching at a specified temperature". However, as in the former application, this method also has such problems that PTFE agglomerate tends to be formed inside the membrane and a sheet with an uneven surface tends to be formed. Since it is difficult to produce a thin membrane in particular when such uneven surface is formed, for instance, said application describes that the membrane is subjected to a smoothing treatment using a roll press or the like prior to thinning by stretching. Further, JP-B-61-16288 discloses a roll press method for such a purpose. As described above, the conventional technologies disclosed in JP-A-53-149881, JP-B-63-61337 and JP-B-61-16288 and the like are limited to mere addition of PTFE, and therefore have not been accepted as an industrially useful technology for an ion exchange membrane for a fuel cell due to difficulties, in particular, in an uniform dispersion, a superior melt molding of PTFE and also an effective use of PTFE.

Furthermore, JP-A-2001-29800 discloses an ion exchange membrane prepared by using an aqueous dispersion containing at least three essential components of fine particles of fluorocarbon resin, an ion exchangeable polymer and a fluorine-containing surface-active substance. This application further discloses a method for preparing such an aqueous dispersion by mixing three essential components of an aqueous suspension of fine particles of fluorocarbon resin, a solution of an ion exchangeable polymer and a solution of a fluorine-containing surface-active substance. Said application describes the use of a solution of the ion exchangeable polymer as a characteristic of the invention, and therefore does not describe anything about washing, which is essential to use a dispersion of an ion exchange fluorocarbon resin precursor. Further, the application does not describe that the aqueous suspension or solution can be obtained directly from a polymerization liquid in each polymerization process without separating or agglomerating solid resin. For instance, judging from the description in the application that a solution of an ion exchangeable polymer is prepared using water or an organic liquid as a solvent, it can be understood that at least the solution of the ion exchangeable polymer is prepared using the ion exchangeable polymer once separated or agglomerated from a polymerization liquid.

The use of the solution of such ion exchangeable polymer has the following problems:

1) It is known that an aqueous suspension of fine particles of fluorocarbon resin is generally less stable under acidic conditions, and a solution of an ion exchangeable polymer is required to be stabilized by, for instance, adding a fluorine-containing surface-active substance as described in said application, because the solution is naturally strongly acidic and easy to agglomerate in mixing;
2) Preparation of an ion exchangeable polymer solution is required to be carried out through many steps such as separation, hydrolysis and dissolution starting from an ion exchange resin precursor, which should be basically obtained in the form of polymerization liquid, and this results in a complicated process and a low productivity;
3) Since the ion exchangeable polymer once isolated or agglomerated is dissolved again, the molecular chains of the polymer becomes entangled though they originally possesses an ideal expanded form after the polymerization. High dispersion with the aqueous suspension of fine particles of the fluorocarbon resin cannot be effected even when the entangled polymer is dispersed in a solvent.

DISCLOSURE OF THE INVENTION

An object of the present invention is to provide a method for manufacturing an ion exchange fluorocarbon resin precursor composition excellent in mechanical strength and melt moldability.

One of the reasons for the problem of PTFE dispersion in the conventional technologies is considered to be an insufficient mutual contact between the ion exchange resin precursor shown in the prior art and the PTFE shown in the prior art. After an extensive study, the present inventors found that a uniform dispersion could be attained by mixing a specified dispersion of an ion exchange fluorocarbon resin precursor and a PTFE dispersion, and that the ion exchange fluorocarbon resin precursor composition thus produced was excellent in melt moldability and in particular could produce a high quality sheet by extrusion sheet molding, in accordance with the present invention. Thus, the present invention relates to a method for manufacturing an ion exchange fluorocarbon resin precursor composition characterized by comprising a step of mixing a dispersion of an ion exchange fluorocarbon resin precursor and a PTFE dispersion, and a step of removing a liquid component from said liquid mixture.

Figure 1:
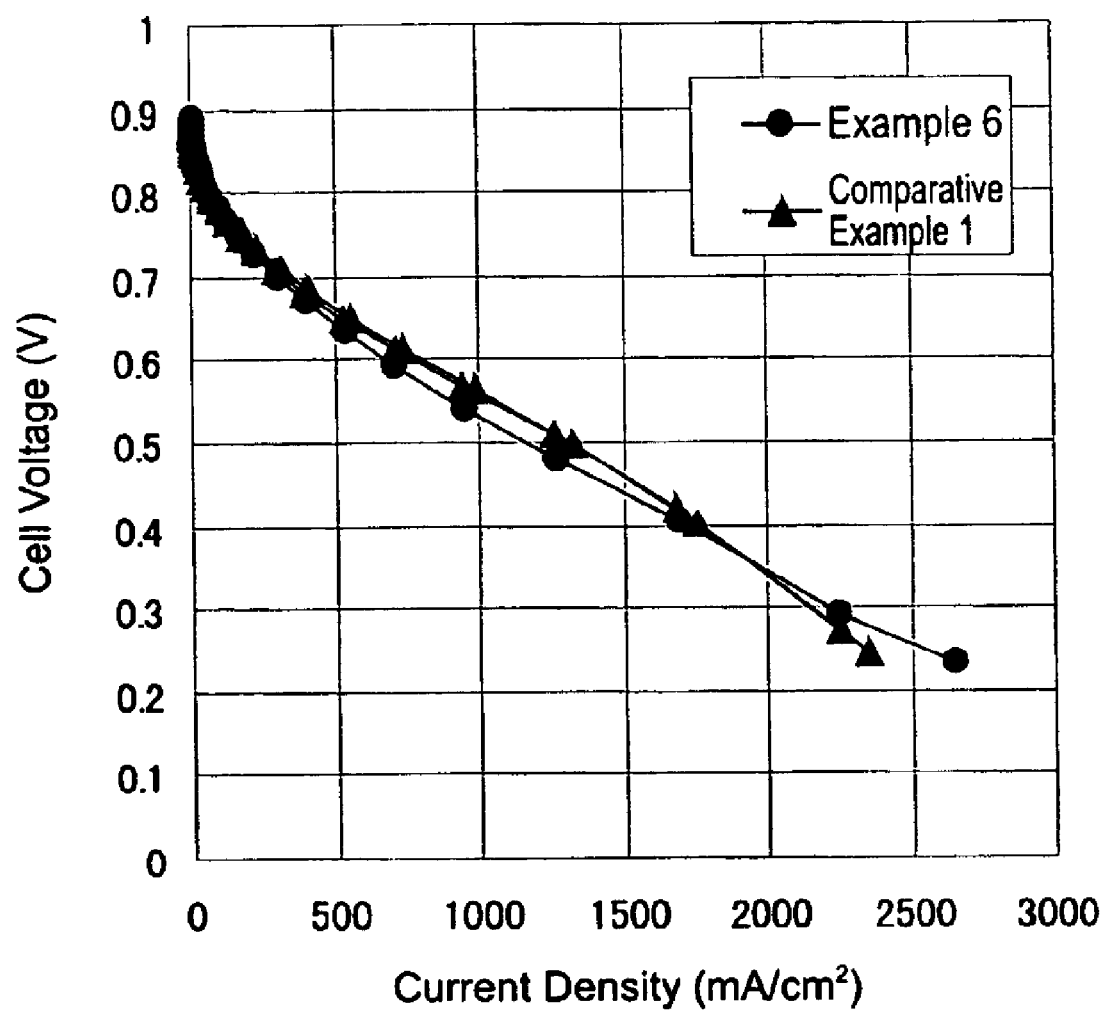
FIG. 1 shows results of a fuel cell performance test in Example 6.

BEST MODE FOR CARRYING OUT THE INVENTION (Method for Manufacturing an Ion Exchange Fluorocarbon Resin Precursor)

An ion exchange membrane can be manufactured by forming a membrane of an ion exchange resin precursor having melt moldability (thermoplasticity), then forming ion exchange groups by hydrolysis.

An ion exchange fluorocarbon resin precursor of the present invention comprises at least a binary copolymer of a fluorinated vinyl compound represented by the formula:

and a fluorinated olefin represented by the general formula: $CF_2=CFZ$. Wherein, L is a fluorine atom or a perfluoroalkyl group with carbon atoms of 1 to 3; n is an integer of 0 to 3; m is an integer of 1 to 3; Z is H, Cl, F or a perfluoroalkyl group with carbon atoms of 1 to 3; and W is a functional group convertible to $CO_2H$ or $SO_3H$ by hydrolysis, and usually such functional groups as $SO_2F$, $SO_2Cl$, $SO_2Br$, COF, COCl, COBr, $CO_2CH_3$ and $CO_2C_2H_5$ are preferably used. For instance, an ion exchange fluorocarbon resin precursor of L=$CF_3$, W=$SO_2F$ or $CO_2CH_3$, Z=F in the above formula is widely used.

Such an ion exchange fluorocarbon resin precursor can be synthesized by the conventionally known means. For instance, the known methods include: a polymerization method to react the above fluorinated vinyl compound and the fluorinated olefin gas by charging and dissolving them in a polymerization solvent such as a fluorine-containing hydrocarbon (solution polymerization); a polymerization method to use the fluorinated vinyl compound itself as a polymerization solvent without using a solvent such as "flons" (bulk polymerization); a polymerization method to charge and react the fluorinated vinyl compound and the fluorinated olefin gas, using an aqueous solution of a surfactant as a medium (emulsion polymerization); a polymerization method to react the fluorinated vinyl compound and the fluorinated olefin gas by charging and emulsifying them in an aqueous solution of an auxiliary emulsifier such as a surfactant and an alcohol (mini-emulsion polymerization or micro-emulsion polymerization); and a polymerization method to react the fluorinated vinyl compound and the fluorinated olefin gas by charging and suspending them in an aqueous solution of a suspension stabilizer (suspension polymerization); and the like. Any of these polymerization methods can be used in the present invention. As the fluorine-containing hydrocarbons to be used for the polymerization solvent in the solution polymerization, a group of compounds generally referred to as "flons", such as trichlorotrifluoroethane and 1,1,1,2,3,4,4,5,5,5-decafluoropentane can be suitably employed. In addition, in the present invention, a dispersion obtained by the above polymerization reaction can be used as it is as a dispersion of the ion exchange fluorocarbon resin precursor, as described later.

(Method for Manufacturing PTFE)

The PTFE can also be synthesized by the conventionally known means. More specifically, these known methods include: suspension polymerization, emulsion polymerization, mini-emulsion polymerization and micro-emulsion polymerization where a polymerization is conducted in an aqueous medium, and solution polymerization where a polymerization solvent such as a fluorine-containing hydrocarbon is used, and the like. In the present invention, a PTFE produced by any of these polymerization methods can be used. As a fluorine-containing hydrocarbon to be used for the polymerization solvent in the solution polymerization, a group of compounds generally referred to as "flons", such as trichlorotrifluoroethane and 1,1,1,2,3,4,4,5,5,5-decafluoropentane can be suitably employed. In addition, in the present invention, a dispersion obtained by the above polymerization reaction can be used as it is as a PTFE dispersion, as described later.

(Dispersion)

Both an ion exchange fluorocarbon resin precursor and a PTFE obtained by the above polymerization methods are dispersed in the liquid components such as a fluorine-containing hydrocarbon, a residual monomer and water. In the present invention, such a dispersion itself can be used as it is, without substantially separating polymer components from the dispersion. Although the dispersion in the present invention usually means a dispersion itself after a polymerization reaction, other dispersion media may be added if necessary or may even replace the original dispersion medium by further forwarding the addition of other media if necessary.

(Mode of Polymerization Method and Mixing Stability)

The above polymerization methods are classified roughly into two modes, namely, a polymerization mode using a non-aqueous medium (hereinafter, referred to as non-aqueous polymerization: solution polymerization, bulk polymerization and the like) and a polymerization mode using an aqueous medium (hereinafter, referred to as aqueous polymerization: emulsion polymerization, mini-emulsion polymerization, micro-emulsion polymerization, suspension polymerization and the like). For instance, it is preferable that both the polymerization method of the dispersion of the ion exchange fluorocarbon resin precursor and that of the dispersion of PTFE belong to the same mode, because a better compatibility of both dispersion media and a more homogeneous dispersion can be attained during mixing of both dispersions. In particular, it is more preferable for realizing a very homogeneous dispersion that a mode of said polymerization method belongs to the non-aqueous polymerization, because the molecular chains of the polymer are more expanded in the dispersion prepared by the non-aqueous polymerization compared to those from the aqueous polymerization. Suitable polymerization solvents for such non-aqueous polymerization include fluorine-containing hydrocarbons.

On the other hand, when polymerization methods of dispersion of an ion exchange fluorocarbon resin precursor and that of a PTFE dispersion belong to a different modes from each other, generally homogeneous mixing can hardly be expected due to a poor affinity between each dispersion medium. However, the present inventors found that an emulsion-like dispersion could be formed and well mixed in many cases, even during mixing of dispersions belonging to a different mode of polymerization method from each other. Although a reason thereof has not yet been clarified, it can be supposed that a dispersion produced by an aqueous polymerization which usually contains an emulsifier, an auxiliary emulsifier, a suspension stabilizer or the like, can exhibit a good mixing stability unlike a single dispersion lacking these agents. In the present invention, mixing stability can be improved by further adding an emulsifier, an auxiliary emulsifier, a suspension stabilizer, a water-soluble polymer or the like if necessary.

Since these agents such as an emulsifier, an auxiliary emulsifier and a suspension stabilizer may impair a thermal stability in melting and a dispersion stability of a composition if they remain in large amounts in the composition, it is desirable to sufficiently remove the agents after a mixed dispersion is obtained. According to a method of the present invention, removal of these impurities is possible and easy without losing homogeneity of the dispersion.

The present invention is characterized by using a dispersion of an ion exchange fluorocarbon resin precursor, which does not show strong acidity, therefore, mixing with a PTFE dispersion can be done successfully, avoiding agglomeration of PTFE. In other words, the amount of a surfactant in the present invention is almost enough with an amount of the emulsifier mixed in advance in the PTFE dispersion to emulsify the fine particles of PTFE, and it should therefore be considered that a surfactant or the like added as required is not for stabilization of the fine particles of PTFE, but for promotion of a mutual emulsification of the dispersions.

(Dispersion of an Ion Exchange Fluorocarbon Resin Precursor)

The content of solid component in a dispersion of an ion exchange fluorocarbon resin precursor is 1 to 99%, and preferably 2 to 50%. The content of solid components less than 1% is not preferable because it requires a long time to remove liquid components after mixing. A content of solid components more than 99% is also not preferable because mixing becomes difficult due to too high a viscosity. The dispersion of the ion exchange fluorocarbon resin precursor can be used by adding other dispersion media or stabilizers if necessary. The average diameter of polymer particles in the dispersion of the ion exchange fluorocarbon resin precursor is preferably 50 $\mu$m or less, and more preferably 10 $\mu$m or less.

(Dispersion of PTFE)

The content of solid component in a dispersion of PTFE is 1 to 99%, and preferably 2 to 50%. The content of solid components less than 1% is not preferable because it requires a long time to remove liquid components after mixing. A content of solid components more than 99% is also not preferable because mixing becomes difficult due to too high a viscosity. The dispersion of PTFE can be used as it is, when mixing stability with the dispersion of the ion exchange fluorocarbon resin precursor is good. When mixing stability is not sufficient, it can be improved by using a means such as adding a stabilizer, for instance, a surfactant; emulsifying by adding a dispersion medium compatible with a dispersion medium of the dispersion of the ion exchange fluorocarbon resin precursor; and converting the dispersion medium to the dispersion medium of the dispersion of the ion exchange fluorocarbon resin precursor. In any case, it is preferable not to impair the dispersion stability during operations. The average diameter of polymer particles in a dispersion of PTFE is preferably 50 $\mu$m or less, and more preferably 10 $\mu$m or less. Further, with regard to the dispersion of PTFE prepared by an aqueous polymerization, for instance, it is preferable for the surface of PTFE particles in said dispersion to be coated with the ion exchange fluorocarbon resin precursor or the like in advance, from the viewpoint that a better dispersibility of PTFE can be obtained in the ion exchange fluorocarbon resin precursor composition. Embodiments thereof includes a method to further add a fluorinated vinyl compound of the present invention at the later stage of PTFE polymerization, a method to polymerize PTFE after the ion exchange fluorocarbon resin precursor is added, and the like.

(Mixing of Dispersions)

As a mixing method of the dispersions, any known conventional method can be used. For instance, mixing can be performed by stirring a dispersion of an ion exchange fluorocarbon resin precursor and a dispersion of PTFE in a closed vessel equipped with a stirrer. Stirring is usually performed at the temperature of the boiling point of a dispersion medium or less, suitably at 0° C. to a room temperature. The time and rate of stirring must be adjusted depending on the viscosity and the like of the liquid mixture, and it is possible to attain homogeneous mixing within a few minutes by adjusting the contents of solid components of both dispersions. A mixing ratio of both dispersions can be adjusted as desired. The weight of PTFE is preferably 0.1 to 50%, more preferably 0.2 to 25%, and further more preferably 0.3 to 10% based on the weight of an ion exchange fluorocarbon resin precursor.

As a method to remove a liquid component, any known conventional method can be used. For instance, the following methods can be suitably employed: a method to settle solid components by adding a substance having an ability to destroy a dispersion; a method to distill a liquid component off by stirring a dispersion mixture while heating; or the like. As the substance having an ability to destroy a dispersion, a substance lowering the affinity between the dispersion medium and the solid components, for instance, a common organic solvent such as alkanol, alkane, ketone, ether and methylene chloride can be used. Any known conventional method can be used as a method for distilling off the liquid components. Preferably, the liquid components can be suitably distilled off by using a paddle dryer while heating. A fluorine-containing hydrocarbon or the like with a low boiling point can be distillated off under atmospheric pressure, whereas a residual monomer or the like with a high boiling point is preferably distilled off under a reduced pressure. When a residual monomer or the like with a high boiling point remains in large amount in any method, solid components are preferably sufficiently leached by further adding a fluorine-containing hydrocarbon and repeating the above procedure several times.

(Melt Kneading of an Ion Exchange Fluorocarbon Resin Precursor Composition)

As a method for melt kneading of said composition, any commonly known method for melt kneading such as kneading between two mill rolls, kneading by a Banbury mixer and kneading by an extruder can be suitably used. In the case of a composition containing a high content of PTFE of more than 25%, a final PTFE content can be lowered by melt kneading the composition with an additional ion exchange fluorocarbon resin precursor. This method is suitable for mass production of an ion exchange fluorocarbon resin, where a composition of high PTFE content is prepared in advance, and used as a master-batch to be diluted with the ion exchange fluorocarbon resin precursor.

In the above JP-A-53-149881, when a PTFE and an ion exchange fluorocarbon resin precursor are mixed together, the latter is mixed in the state of a powder or swollen with trichlorotrifluoroethane then melt kneaded, resulting in an irregular fibrillation and impairing the melt moldability of the composition and the efficient use of the PTFE. On the other hand, in the present invention, since the PTFE and the ion exchange fluorocarbon resin precursor are mixed then kneaded in a state of dispersion where molecular chains are expanded sufficiently, the fibrillation becomes more uniform and the melt moldability of the composition and the efficiency in use of the PTFE can be greatly improved.

Further, a composition of the present invention does not require a melt kneading before melt molding, because it has a greatly superior homogeneous dispersibility than the conventional compositions even without melt kneading. In other words, it is possible to perform a melt molding without any substantial kneading of the composition. The composition melt molded without any substantial kneading is useful particularly in the case requiring supression of abnormal viscosity troubles (sharkskin, melt fracture or the like) in a melt molding, because of controlled fibrillation of the PTFE. In the case of melt molding by this method, a homogeneously dispersed PTFE can be fibrillated sufficiently by various post-treatments (stretching, rolling or the like) after a film-forming.

(Molecular Weight of a PTFE)

Molecular weight of a PTFE of the present invention is not particularly limited, but is preferably 100,000 to 20,000,000, more preferably 200,000 to 10,000,000, further more preferably 300,000 to 6,000,000. In this range, it is commonly known that the PTFE with a molecular weight of 1,000,000 or more tends to be fibrillated by a shearing stress. Since such fibrillation is known to become intense at a temperature higher than the crystalline transition point (20° C.), dispersions may be mixed at a temperature lower than room temperature if necessary, preferably at a temperature lower than the crystalline transition point, for instance, when fibrillation is required to be reduced in mixing of the dispersions. The crystalline transition point is described in detail in "Fluoroplastics" (Takaomi Satokawa, et al., The Nikkan Kogyo Shimbun, Ltd., 1969). A higher crystallinity of PTFE is preferable, but even a copolymer containing other component of 20% or less will not be a major obstacle to the purpose of the present invention.

(Method for Producing an Ion Exchange Membrane)

Hereinbelow, a method for manufacturing an ion exchange membrane from an ion exchange fluorocarbon resin precursor composition manufactured according to a manufacturing method of the present invention will be described.

(Film-forming Step)

In order to form a membrane from an ion exchange fluorocarbon resin precursor composition, any commonly known molding method can be suitably used, including melt molding methods (T-die method, blowing method, calendaring method or the like) and a casting method. Examples of the casting method include a method for forming a sheet from a dispersion of said composition then removing a dispersion medium; a method of dissolving or dispersing an ion exchange fluorocarbon resin composition produced by hydrolyzing an ion exchange fluorocarbon resin precursor composition in water or water/alcohol mixture, then forming a sheet from said solution or dispersion and removing the solvent; and the like. Resin temperatures in melt molding by the T-die method are preferably 100 to 300° C., and more preferably 200 to 280° C. Resin temperatures in melt molding by the blowing method are preferably 100 to 300° C., and more preferably 160 to 240° C. A sheet melt molded by these methods is cooled to a melting temperature or less by using a chill roll or the like.

As described above, the PTFE in a membrane molded by a combination of ram extrusion and a slit die is preferably fibrillated sufficiently by various post-treatments (stretching, rolling or the like) after the film-forming.

(Hydrolysis Step)

An ion exchange fluorocarbon resin membrane is obtained by hydrolyzing the above-described sheet. As a method for hydrolysis, a known conventional method can be used such as the method described in Japan Patent No. 2753731 where an ion exchange group precursor of the above-described sheet is converted to a metal salt-type of ion exchange group by using an alkali hydroxide solution, then further converted to an acid-type ($SO_3H$ or $CO_2H$) of ion exchange group by using an acid such as sulfonic acid or hydrochloric acid. Such conversions are known to those of skill in the art and described in Examples of the present invention.

(Hot Water Treatment Step)

When a higher ion conductivity is desired, a hot water treatment can be applied after the hydrolysis step if necessary. For instance, an ion exchange membrane is subjected to a swelling treatment by heating in water or a water-miscible organic solvent followed by converting to an acid type again, to obtain an ion exchange membrane with a higher water content, as described in JP-A-6-342665.

(Equivalent Weight)

The equivalent weight (EW) of an ion exchange fluorocarbon membrane of the present invention is not particularly limited, but is preferably 400 to 1,400, and more preferably 600 to 1,200. With too large an equivalent weight, it is difficult to attain a high water content due to the low density of ion exchange groups, and also it is unfavorable due to low ion conductivity. On the other hand, too low an equivalent weight is not preferable due to low strength.

(Membrane Thickness)

The thickness of an ion exchange fluorocarbon resin membrane of the present invention is 1 to 500 $\mu$m, preferably 5 to 100 $\mu$m, more preferably 10 to 50 $\mu$m. A membrane thickness less than 1 $\mu$m tends to cause troubles described above due to diffusions of hydrogen and oxygen, as well as troubles such as a damage of membrane caused by handling during fuel cell fabrication or by differential pressure, strain or the like during fuel cell operation. A membrane with a thickness of more than 500 $\mu$m generally has a low ion permeability, resulting in insufficient performance as an ion exchange membrane.

(Degree of PTFE Dispersion)

The degree of PTFE dispersion of an ion exchange fluorocarbon resin membrane of the present invention is preferably 0.8 or more, more preferably 0.9 or more, further more preferably 0.95 or more, and still further more preferably 0.98 or more. When a PTFE agglomerate is generated inside the matrix as in the conventional technology, only a lower degree of dispersion can be obtained even if the same weight of PTFE is added, because the amount of PTFE that actually contributes to a mechanical strength in the matrix decreases.

(Manufacturing Method for Membrane/Electrode Assembly)

Next, manufacturing method for a membrane/electrode assembly (MEA) will be described. MEA is manufactured by bonding electrodes to an ion exchange fluorocarbon resin membrane. An electrode is composed of fine particles of a catalyst metal and a conductive agent carrying them, and additionally contains a water repellant if necessary. The catalyst used for the electrode is not particularly limited as long as it is a metal promoting the oxidation reaction of hydrogen and the reduction reaction of oxygen, and includes platinum, gold, silver, palladium, iridium, rhodium, ruthenium, iron, cobalt, nickel, chromium, tungsten, manganese, vanadium and alloys thereof. Among them, platinum is mainly used. The conductive agent may be any electron-conductive material such as various kinds of metals and carbon materials. The carbon materials include, for instance, carbon blacks such as furnace black, channel black and acetylene black; activated carbon; and graphite, used alone or in combinations thereof. The water repellant is preferably a fluorine-containing resin having water repellency, and more preferably one excellent in heat resistance and oxidation resistance. Such materials include, for instance, polytetrafluoroethylene, tetrafluoroethylene-perfluoroalkylvinylether copolymer and tetrafluoroethylene-hexafluoropropylene copolymer.

As such an electrode, for instance, an electrode made by E-TEK is widely used. MEA is manufactured from the above-described electrode and an ion exchange fluorocarbon resin membrane by, for instance, the following method. An ion exchange fluorocarbon resin is dissolved in a mixed solvent of alcohol and water to prepare a solution, in which carbon carrying platinum, as an electrode material, is dispersed to make a paste-like substance. This paste is then coated on PTFE sheets in a specified amount and dried. Then, said PTFE sheets are placed so that the coated surfaces thereof are in opposing position with an ion exchange resin membrane being sandwiched between the coated surfaces, followed by bonding thereof using a hot press. The temperature of the hot press depends on the type of ion exchange resin membrane, but usually is at least 100° C., preferably at least 130° C., and more preferably at least 150° C.

Another manufacturing method of MEA is described in "J. Electrochem. Soc. Vol. 139, No. 2, L28–L30 (1992)". According to this method, an ion exchange fluorocarbon resin is dissolved in a mixed solvent of alcohol and water followed by converting to SO$_3$Na to prepare a solution, to which carbon carrying platinum is added to obtain an ink-like solution. Said ink-like solution is coated on a surface of an ion exchange fluorocarbon resin membrane which has been converted to SO$_3$Na type in advance, followed by removal of solvent and conversion of all ion exchange groups to SO$_3$H to obtain an MEA. The present invention can be applied to such an MEA.

(Manufacturing Method for Fuel Cell)

Next, manufacturing method for a solid polyelectrolyte type of fuel cell will be described. Solid polyelectrolyte type of fuel cell is composed of MEA, current collector, fuel cell frame, gas feed equipment and the like. Current collector (bipolar plate), among them, is a flange made of graphite or a metal, having gas passage at the surface and the like, which has a function to transfer electrons to an external load circuit and supply hydrogen or oxygen to the MEA surface. Fuel cells are prepared by inserting an MEA between such current collectors and piling up a plurality of the laminates.

The fuel cell is operated by feeding hydrogen to one electrode, and oxygen or air to the other electrode. A higher operation temperature of the fuel cell is preferable because catalytic activity is more enhanced, but the temperature is usually 50 to 100° C. for easy control of water content. On the other hand, an ion exchange membrane of the present invention may be operated at 100 to 150° C. due to an improved strength at high temperature and in high humidity. A higher feed pressure of oxygen or hydrogen is preferable due to increased output of the fuel cell, but the pressure is preferably adjusted to within a suitable range to reduce the probability of contact of both materials caused by a membrane failure and the like.

The present invention will be described in more detail by the following Examples. Testing methods for the properties shown in the Examples are as follows.

(1) Membrane Thickness

The thickness of an acid type of ion exchange membrane was measured by a membrane thickness gage (made by Toyo Seiki Seisaku-Sho Ltd.: B-1) after standing for 12 hours or more in an air-conditioned chamber controlled at 23° C. and 65% relative humidity.

(2) Equivalent Weight

About 2 to 10 cm$^2$ of an acid type of ion exchange membrane was dipped in a 50 ml of saturated aqueous NaCl solution at 25° C. The solution was left standing for 10 minutes while stirring, then neutralized by titration with 0.01 N sodium hydroxide aqueous solution using phenolphthalein as an indicator. The Na type of ion exchange membrane obtained after the neutralization was rinsed with pure water, then vacuum dried and weighed. Equivalent weight EW (g/eq) was obtained by the following formula:

$$EW=(W/M)-22$$

wherein, M (mmol) is an equivalent of sodium hydroxide required for neutralization; W (mg) is a weight of the Na type of ion exchange membrane.

(3) Melt Flow Index

MI (g/10 min) is a melt flow index of an ion exchange fluorocarbon resin precursor measured at 270° C. and with 2.16 kg of weight in accordance with JIS K 7210. In addition, swell (%) is an increment of a calipered diameter of a strand extruded out of an orifice to the diameter of the orifice.

(4) Critical shear rate

Flow properties at a shear rate from 0.5/sec to 500/sec were measured at 270° C. in accordance with JIS K 7199, using a capillary rheometer (Capillograph made by Toyo Seiki Seisaku-Sho Ltd., orifice: 1×10 mm). A ripple-like melt fracture phenomenon was observed on the surface of a strand as the shear rate increased. Critical shear rate is the shear rate at which the melt fracture phenomenon is observed for the first time.

EXAMPLE 1

PTFE of Low Molecular Weight: Distillation Off by Heating

To a 20 liter autoclave made of stainless steel, 11.60 kg of CF$_2$Cl—CFCl$_2$ (hereinafter, referred to as CFC-113), 5.60 kg of CF$_2$=CF—O—CF$_2$CF(CF$_3$)—O—CF$_2$CF$_2$—SO$_2$F and 0.35 g of methanol as a molecular weight modifier were charged. The inside of the autoclave was purged with nitrogen, then with tetrafluoroethylene (TFE: CF$_2$=CF$_2$). After adjusting the temperature to 25° C. and the pressure of TFE to 0.165 MPa-G (gage pressure), and adding 140 g of CFC-113 solution containing 5% by weight of (n-C$_3$F$_7$CO$_2$—)$_2$, a polymerization was carried out. The polymerization was continued for 5 hours while charging TFE intermittently from an external source and reducing the pressure of TFE from 0.165 MPa-G at the beginning to 0.149 MPa-G at the end of polymerization. The TFE in the polymerization vessel was purged with nitrogen and the pressure was reduced to atmospheric pressure, to obtain 16.80 kg of a dispersion of ion exchange fluorocarbon resin precursor containing 8.4% by weight of a solid component in the dispersion media of CFC-113 and $CF_2=CF-O-CF_2CF(CF_3)-O-CF_2CF_2-SO_2F$. To 800.5 g of this dispersion, a triple volume of methanol was added to settle the slurry. After the mixture was left standing, a supernatant liquid was removed by decantation. Subsequently, washing with about 0.5 liters of a mixed liquid of methanol/CFC-113=1/2 (ratio by volume) and removal of supernatant liquid by decantation were repeated three times, followed by drying for 16 hours under a reduced pressure at 110° C. to obtain 66.9 g of powder. Said powder (a completely solidified ion exchange fluorocarbon resin precursor) gave an equivalent weight of 945, a melt flow index of 13.7 and a swell of 29%.

1.58 kg of PTFE dispersion (Rublon (registered trademark) LD-1E, made by Daikin Industries, Ltd.: solution polymerization) containing 4.6% by weight of a solid component and HCFC-141b as a dispersion medium was added to 16.00 kg of the remaining above dispersion, and mixed under stirring. Both of these dispersions were well compatible, forming a mixed dispersion. CFC-113 and HCFC-141b were then distilled off from the mixed dispersion at 90° C. under atmospheric pressure in a horizontal type of paddle dryer equipped with a rotating blade agitator. The residual monomer was then distilled off at 90° C. under a reduced pressure to obtain 1.41 kg of an ion exchange fluorocarbon resin precursor composition. The thus obtained composition was washed with 3 liters of CFC-113, and this procedure was repeated three times. The composition was further left standing and dried at 110° C. for 16 hours under a reduced pressure to finally obtain 1.34 kg of a solid component. This solid component gave an equivalent weight of 998, a melt flow index of 15.1, a swell of 16% and a critical shear rate of 200/sec. In addition, the solid component was kneaded at 285° C. and 100 rpm for 30 minutes using a batch type of melt kneader (Plastomill made by Toyo Seiki). The melt kneaded composition gave a melt flow index of 15.8, a swell of 12% and a critical shear rate of 200/sec. The solid components, before and after the melt kneading, were press-molded at 270° C. and 20 MPa to obtain a membrane with a thickness of about 200 µm. All membranes obtained were uniform, and any PTFE agglomerate or the like was not found by an inspection using an optical microscope of 200 magnification.

EXAMPLE 2

PTFE of Low Molecular Weight: Solvent Settling with Methanol 15.80 kg of mixed dispersion was obtained by using the same method as in Example 1. The mixed dispersion was added to 6 liters of methanol and mixed under stirring to form a white swollen slurry. The swollen slurry was settled, and the supernatant liquid was removed by decantation. The slurry was added to 9 liters of mixed liquid containing methanol and CFC-113 at a ratio of 1:2 (ratio by volume), mixed by stirring, then decanted to remove the supernatant liquid. The same procedure was repeated a further two times. Subsequently, low boiling point components were purged with dry nitrogen while stirring. By this procedure, the composition became paste-like, then powder. Subsequently the powder was dried at 110° C. for 16 hours under a reduced pressure to obtain 1.36 kg of an ion exchange fluorocarbon resin precursor composition. The powder was then washed with 3 liters of CFC-113 three times. The powder was further left standing, and dried at 110° C. for 16 hours to finally obtain 1.29 g of a solid component. The solid component gave an equivalent weight of 993, a melt flow index of 14.3, a swell of 18% and a critical shear rate of 200/sec. In addition, the solid component was kneaded at 285° C. and 100 rpm for 30 minutes using a batch type of melt kneader (Plastomill made by Toyo Seiki Seisaku-Sho). The melt kneaded composition gave a melt flow index of 13.7, a swell of 16% and a critical shear rate of 175/sec. The solid component before and after the melt kneading were press-molded at 270° C. and 20 MPa to obtain a membrane with a thickness of about 200 µm. all membranes thus obtained were uniform and any PTFE agglomerate or the like was not found by an inspection using an optical microscope of 200 magnification.

EXAMPLE 3

PTFE of High Molecular Weight: Solvent Settled with Solvent Methanol

To 15.00 kg of the dispersion of ion exchange fluorocarbon resin precursor of Example 1, 110 g of a PTFE dispersion (Polyflon (registered trademark) D-2C, made by Daikin Industries, Ltd.: emulsion polymerization) containing 60% by weight of a solid component and water as a dispersion medium was added and mixed under stirring to obtain 15.11 kg of a homogeneous mixed dispersion. The mixed dispersion was added to the same volume of methanol, and mixed under stirring to form a white swollen slurry. The swollen slurry was settled, and the supernatant liquid was removed by decantation. Then, to the slurry, 10 liters of mixed liquid containing methanol and CFC-113 at a ratio of 1:2 (ratio by volume) were added, mixed under stirring and then decanted to remove the supernatant liquid. The same procedure was repeated a further four times. Subsequently, low boiling point components were purged with dry nitrogen while stirring. By this procedure, the composition became paste-like, then powder. Subsequently, the powder was dried at 110° C. for 16 hours under a reduced pressure to obtain 1.2 kg of a solid component of an ion exchange fluorocarbon resin precursor composition. The solid component gave an equivalent weight of 1,002, a melt flow index of 14.0 and a concentration of PTFE of 5.2% by weight. The solid component was press-molded at 270° C. and 20 MPa to obtain a membrane with a thickness of about 200 µm. The membrane obtained was cloudy with homogeneously dispersed PTFE, but any PTFE agglomerate or the like was not found by an inspection using an optical microscope of 200 magnification.

EXAMPLE 4

PTFE of High Molecular Weight: Neutralization and Mixing 110 g of PTFE dispersion of Example 3 was neutralized by adding 0.7 g of 1N sulfuric acid, then added to 200 g of CFC-113 under stirring to prepare an emulsion-like dispersion. This dispersion was added to 15.00 g of the same dispersion of ion exchange fluorocarbon resin precursor as that in Example 1, and mixed under stirring to obtain 15.31 kg of a homogeneous mixed dispersion. Then, the mixed dispersion was added to 5 liters of a mixed liquid containing water and methanol at a ratio of 3:2 (ratio by volume), mixed under stirring, settled and decanted to remove the supernatant liquid. The same procedure was repeated a further three times. Subsequently, the CFC-113 and residual monomer were distilled off from the mixed dispersion at 90° C. under a reduced pressure in a horizontal type of paddle dryer equipped with a rotating blade agitator to obtain a powder.

By washing the powder with 5 liters of CFC-113 followed by drying at 110° C. for 16 hours under a reduced pressure, 1.1 kg of a solid component of an ion exchange fluorocarbon resin precursor composition was obtained. The solid component gave an equivalent weight of 995, a melt flow index of 16.0 and a concentration of PTFE contained of 4.5% by weight. The solid component was press-molded at 270° C. and 20 MPa to obtain a membrane with a thickness of about 200 μm. The membrane obtained was cloudy with homogeneously dispersed PTFE, but any PTFE agglomerate or the like was not found by an inspection using an optical microscope of 200 magnification.

EXAMPLE 5

PTFE of High Molecular Weight: Melt Kneading for 10 Minutes

The solid component obtained in Example 4 of 100 g was kneaded for 10 minutes at 270° C. and 50 rpm by a batch type of melt kneader (Plastomill made by Toyo Seiki Seisaku-Sho Ltd.). The melt kneaded mixture gave an equivalent weight of 1,002, a melt flow index of 0.55 and a swell of 135%. The solid component was press-molded at 270° C. and 20 MPa to obtain a membrane with a thickness of about 200 μm. The membrane obtained was uniform and any PTFE agglomerate or the like was not found by an inspection using an optical microscope of 200 magnification.

COMPARATIVE EXAMPLE 1

Ion Exchange Fluorocarbon Resin Precursor: Single Substance 16.5 kg of the same dispersion of the ion exchange fluorocarbon resin precursor as that in Example 1 was added with a triple volume of methanol, and the resulting slurry was settled, left standing and decanted to remove the supernatant liquid. Subsequently, washing with 10 liters of a mixed liquid of methanol/CFC-113×1/2 (ratio by volume) followed by leaving for standing and decantation to remove the supernatant liquid was repeated a further three times. After drying the slurry at 110° C. for 16 hours under a reduced pressure, 1.3 kg of the powder was obtained. The powder gave an equivalent weight of 945 and a melt flow index of 13.7. The powder was melt extruded to produce pellets, whose flow property was measured. A critical shear rate was 100/sec.

COMPARATIVE EXAMPLE 2

Melt Blending with a PTFE of Low Molecular Weight: Melt Kneading for 30 Minutes

From 1,707 g of the same PTFE dispersion as that used in Example 1, the solvent contained therein was evaporated using dry nitrogen while stirring. By this procedure, a solid component thereof became past-like, then powder. Subsequently, the powder was left standing and dried at 110° C. for 16 hours under a reduced pressure to finally obtain 79 g of a solid component. Then, 5 g of the above PTFE powder was added to 95 g of pellets of an ion exchange fluorocarbon resin precursor having an equivalent weight of 950 and a melt flow index of 20, and blended sufficiently. The blend was then kneaded at 270° C. and 50 rpm for 30 minutes using a batch type of melt kneader (Plastomill made by Toyo Seiki Seisaku-Sho Ltd.). The melt kneaded mixture gave an equivalent weight of 998, a melt flow index of 12.3, a swell of 9% and a critical shear rate of 75/sec.

COMPARATIVE EXAMPLE 3

Melt Blending with a PTFE of High Molecular Weight: Melt Kneading for 30 Minutes To 100 g of the same PTFE as that used in Example 3, 300 ml of methanol was added to agglomerate the polymer, and washing with 300 ml of methanol was repeated 4 times to obtain fine powder of PTFE. Subsequently, the powder was left standing and dried at 110° C. for 16 hours under a reduced pressure to finally obtain 60 g of a solid component. Then, 5 g of the above PTFE powder was added to 95 g of pellets of an ion exchange fluorocarbon resin precursor having an equivalent weight of 950 and a melt flow index of 20, and blended sufficiently. The blend was then kneaded at 270° C. and 50 rpm for 30 minutes using a batch type of melt kneader (Plastomill made by Toyo Seiki). The melt kneaded mixture gave an equivalent weight of 1,000, a melt flow index of 0.32, a swell of 136%. The solid component was press-molded at 270° C. and 20 MPa to obtain a membrane with a thickness of about 200 μm. The membrane obtained was not uniform and PTFE agglomerate or the like was found by an inspection using an optical microscope of 200 magnification.

COMPARATIVE EXAMPLE 4

Melt Blending with a PTFE of High Molecular Weight: Melt Kneading for 10 Minutes A melt kneaded mixture was prepared by the same method as in Comparative Example 3 except that the kneading time was 10 minutes. The resulting melt kneaded mixture gave an equivalent weight of 1,000, a melt flow index of 0.33 and a swell of 122%. The solid component was press-molded at 270° C. and 20 MPa to obtain a membrane with a thickness of about 200 μm. The membrane thus obtained was not uniform and PTFE agglomerate or the like was found by an inspection using an optical microscope of 200 magnification.

COMPARATIVE EXAMPLE 5

Mixing with a Completely Solidified Ion Exchange Fluorocarbon Resin Precursor

To 20 g of the same powder of the ion exchange fluorocarbon resin precursor as that in Comparative Example 1, 200 ml of CFC-113 was added, and refluxed for 8 hours followed by cooling to obtain about 40 g of the powder swollen with CFC-113. The powder was added to 4.7 g of a dispersion of PTFE:water:CFC-113=21.3:14.2:64.5 (ratio by weight) prepared in the same manner as in Example 4, and mixed by stirring, to obtain a mixed dispersion. By drying said mixed dispersion at 90° C. under a reduced pressure while stirring, CFC-113 and water contained therein were removed to obtain 21 g of powder. The powder was press-molded at 270° C. and 20 MPa to obtain a membrane with a thickness of about 200 μm. The membrane thus obtained was brittle and fragile, colored light gray, and exhibited large uneven spots of PTFE agglomerate.

In addition, when the above powder was subjected to methanol washing, CFC-113 washing and drying by heating under a reduced pressure before press-molding, the unevenness of the PTFE agglomerate was not improved, although the color and the brittleness were improved.

Furthermore, when the mixed dispersion was subjected to methanol washing, CFC-113 washing and drying by heating under a reduced pressure after agglomerated by adding 200 ml of methanol while stirring at room temperature, the unevenness by PTFE agglomerate was also not improved, although the color and the brittleness were improved.

EXAMPLE 6

(Film-formation)

An extruded sheet of the ion exchange fluorocarbon resin precursor composition prepared in Example 1 was produced using a 25 mm single-screw extruder (made by Plastics Engineering Laboratory Co., Ltd.) equipped with a T-die of 400 mm width at 245° C., to obtain a precursor membrane. The slit width was 600 µm and the membrane thickness after passing through chill rolls was 25 µm. The precursor membrane was immersed in a hydrolysis bath heated at 95° C. (DMSO:KOH:water=5:30:65) for 1 hour to obtain a metal salt type of ion exchange membrane. The membrane was, after being washed with water sufficiently, converted to an acid type of ion exchange membrane by immersing in a 2N hydrochloric acid bath heated at 65° C. for 16 hours or more. The membrane was washed with water sufficiently, then dried to obtain a dry membrane with a thickness of 25 µm.
(MEA)

A platinum catalyst carrying carbon-cloth (made by E-TEC: amount of catalyst platinum: 0.4 mg/cm$^2$) was coated with Nafion (registered trademark) solution (EW 1100, 5% by weight) in an amount of 0.8 mg/cm$^2$, followed by drying at 80° C. for 1 hour to obtain an electrode layer. Two sheets of this electrode layer were placed in opposing positions with the above ion exchange membrane being sandwiched therebetween, and pressed at 150° C. under a pressure of 50 kg/cm$^2$ for 90 seconds to prepare an MEA.
(Fuel Cell)

The above-described MEA was fitted into an evaluation equipment for unit fuel cells to carry out a fuel cell performance test using hydrogen gas and oxygen gas at 70° C. under normal pressure. Hydrogen and oxygen were supplied after being humidified at 85° C. and 70° C., respectively. Results of the performance test are shown in FIG. 1. Further, an ion exchange membrane was prepared using the ion exchange fluorocarbon resin precursor in Comparative Example 1 in the same manner as described above, then fitted into a fuel cell, on which a performance test was carried out. Results of the performance test are also shown in FIG. 1.

EXAMPLE 7

The ion exchange fluorocarbon resin precursor composition of Example 5 was press-molded at 270° C. and 20 MPa, to obtain a precursor membrane with a thickness of about 25 µm. The precursor membrane was immersed in a hydrolysis bath (DMSO:KOH:water=5:30:65) heated at 95° C. for 1 hour to covert it to a metal salt type of ion exchange membrane. The membrane was, after being washed sufficiently, immersed in a 2N hydrochloric acid bath heated at 65° C. for 16 hours or more to obtain an acid type of ion exchange membrane. The membrane was washed with water sufficiently, then dried to obtain a dry membrane with a thickness of 25 µm.

EXAMPLE 8

Membrane thicknesses and hazes before and after the hydrolysis were measured for each of the membrane of Example 4, the membrane of Example 5, the membrane obtained from the pellets of Comparative Example 1 by the same method as in Example 4 and the membrane of Comparative Example 4. Haze was measured using a reflectiotransmissometer Model HR-100 (made by Murakami Color Technology Laboratory), in accordance with JIS K 7105. The results of the measurement are shown in Table 1. The ion exchange fluorocarbon resin precursor compositions of the present invention assume a milky white color for a thickness of about 200 µm due to the high dispersibility of PTFE. On the other hand, the ion exchange fluorocarbon resin precursor compositions of the conventional technology show a high transparency even with a thickness of about 200 µm due to a low dispersibility of PTFE. In addition, in a comparison of membranes obtained from the composition of the present invention and the composition of the conventional technology, both melt kneaded for the same time (here, 10 minutes each), many PTFE agglomerates are observed by an visual inspection of the composition of the conventional technology, whereas such PTFE agglomerate is not observed for the composition of the present invention. The composition of the present invention is characterized in that it shows a higher haze than the composition of the conventional technology, reflecting a higher dispersibility and a higher efficiency in the use of PTFE.

TABLE 1

| Composition | Membrane Thickness (µm) | Tt | H |
|---|---|---|---|
| Before Hydrolysis | | | |
| Example 4 (present invention: before kneading) | 197 | 92.9 | 29.2 |
| Example 5 (present invention: after 10 min. kneading) | 200 | 92.1 | 30.8 |
| Comparative Example 1 (without PTFE) | 178 | 97.1 | 1.7 |
| Comparative Example 4 (conventional: after 10 min. kneading) | 258 | 92.2 | 13.7 |
| After Hydrolysis | | | |
| Example 4 (present invention: before kneading) | 201 | 89.9 | 45.0 |
| Example 5 (present invention: after 10 min. kneading) | 249 | 83.4 | 65.2 |
| Comparative Example 1 (without PTFE) | 275 | 95.9 | 2.9 |
| Comparative Example 4 (conventional: after 10 min. kneading) | 302 | 91.2 | 11.7 |

Tt: Transmittance for the whole range of light,
H: Haze

EXAMPLE 9

A melt kneaded mixture was prepared by the same method as in Example 5 except that 3% by weight of PTFE of Example 1 and 2% by weight of PTFE of Example 3 are contained. A dry membrane with a thickness of 25 µm was obtained from this melt kneaded mixture by the same method as in Example 7.
(Diffusion Layer)

A diffusion layer was obtained by applying a mixed liquid of carbon powder (Vulcan XC-72) and an aqueous dispersion of PTFE (made by Du Pont-Mitsui Fluorochemicals Co. Ltd.: 30-J) to a carbon paper (made by Toray Industries, Inc.) in an amount of 3.0 mg/cm$^2$, followed by drying at 340° C. for 7 hours.
(MEA)

An electrode layer was obtained by coating a mixed liquid of 40% by weight of carbon carrying platinum catalyst (made by Tanaka Kikinzoku Kogyo KK) and Aciplex (registered trademark) solution (EW 910, 5% by weight) on a PTFE sheet so that an amount of platinum catalyst became 1.0 to 1.5 mg/cm$^2$, followed by drying at 130° C. for 1 hour. Two sheets of this electrode layer were placed in opposing positions with the above-described ion exchange membrane being sandwiched therebetween, and pressed at 160° C. under a pressure of 50 kg/cm$^2$ for 270 seconds to prepare an MEA.
(Fuel Cell)

Figure 2:
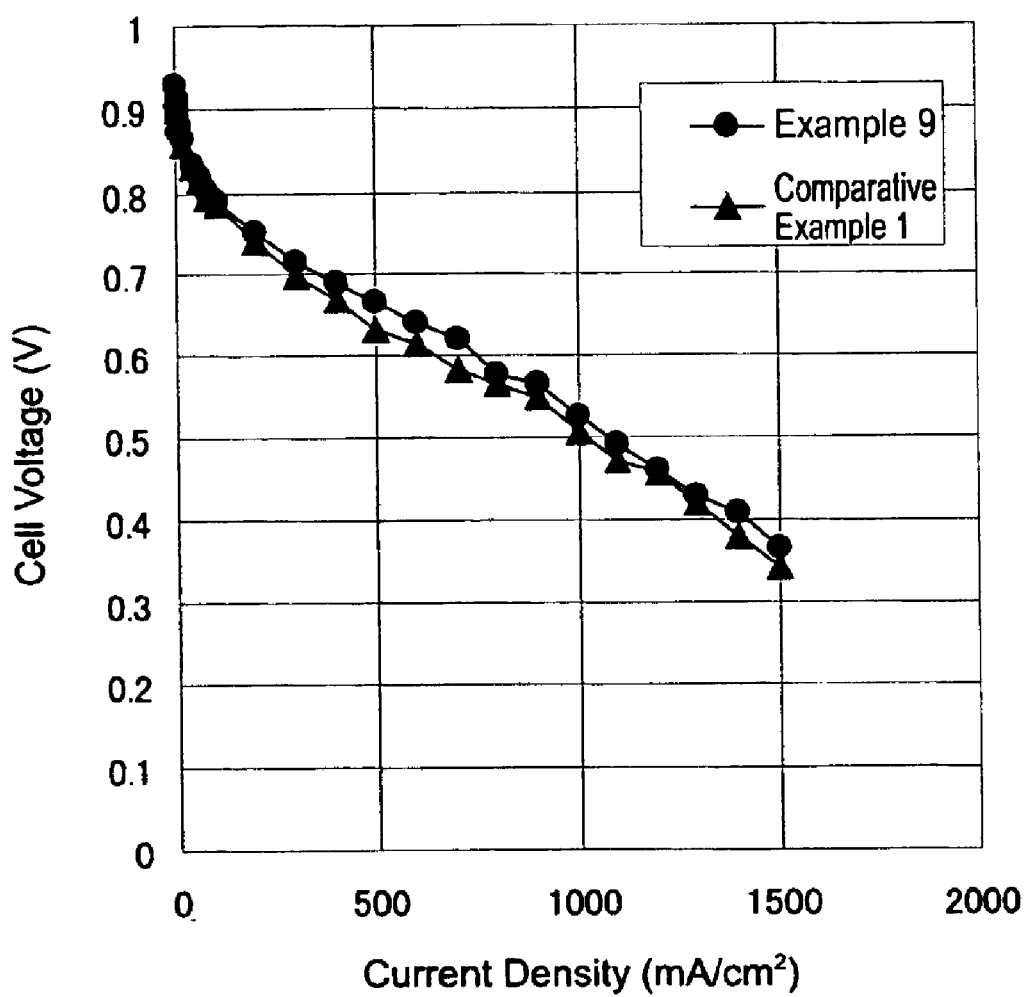
FIG. 2 shows results of a fuel cell performance test in Example 9.

The above-described diffusion layer and MEA were fitted into evaluation equipment for unit fuel cells to carry out a fuel cell performance test using hydrogen gas and air gas at 80° C. under the normal pressure. Hydrogen and air were supplied after being humidified at 80° C. and 30° C., respectively. Results of the performance test are shown in FIG. 2. Further, an ion exchange membrane was prepared using the ion exchange fluorocarbon resin precursor of Comparative Example 1 by the same method as described above, then fitted into a fuel cell, on which a performance test was carried out. Results of the performance test are also shown in FIG. 2.

INDUSTRIAL APPLICABILITY

Since an ion exchange fluorocarbon resin precursor composition manufactured by a method of the present invention is excellent in mechanical strength and also melt moldability because of uniform dispersion of PTFE, it can be molded to a high quality sheet of the ion exchange fluorocarbon resin precursor composition, and particularly has a remarkable effect on an improvement in yield in a large scale production.

What is claimed is:

1. A method for manufacturing an ion exchange fluorocarbon resin precursor composition, comprising the step of preparing a mixed solution by mixing a dispersion of an ion exchange fluorocarbon resin precursor and a dispersion of PTFE, wherein said dispersion of an ion exchange fluorocarbon resin precursor and said dispersion of PTFE are obtained from each polymerization liquid in each polymerization step, respectively, without separating or agglomerating a solid component of each resin and the step of removing liquid components from said mixed solution.

2. The method in accordance with claim 1, wherein said dispersion of an ion exchange fluorocarbon resin precursor is prepared by a solution polymerization or a bulk polymerization using a fluorine-containing hydrocarbon as a polymerization solvent.

3. The method in accordance with claim 1, wherein said dispersion of an ion exchange fluorocarbon resin precursor is prepared by a suspension polymerization, an emulsion polymerization, a mini-emulsion polymerization or a micro-emulsion polymerization.

4. The method in accordance with claim 1, wherein said dispersion of PTFE is prepared by a solution polymerization using a fluorine-containing hydrocarbon as a polymerization solvent.

5. The method in accordance with claim 1, wherein said dispersion of PTFE is prepared by a suspension polymerization, an emulsion polymerization, a mini-emulsion polymerization or a micro-emulsion polymerization.

6. The method in accordance with claim 1, wherein a method for removing a liquid component is distilling off by heating.

7. A method for producing an ion exchange fluorocarbon resin precursor composition, comprising melt kneading an ion exchange fluorocarbon resin precursor composition prepared by the method according to claim 1 and an ion exchange fluorocarbon resin precursor not containing PTFE.

8. An ion exchange fluorocarbon resin precursor composition prepared by the method according to claim 1.

9. An ion exchange fluorocarbon membrane obtained from the ion exchange fluorocarbon resin precursor composition according to claim 8.

10. A membrane/electrode assembly equipped with the ion exchange fluorocarbon membrane according to claim 9.

11. A solid polyelectrolyte type of fuel cell equipped with the ion exchange fluorocarbon membrane according to claim 10.

12. The method in accordance with claim 1, wherein said dispersion of an ion exchange fluorocarbon resin precursor is prepared by a solution polymerization or a bulk polymerization using a fluorine-containing hydrocarbon as a polymerization solvent and said dispersion of PTFE is prepared by a suspension polymerization, an emulsion polymerization, a mini-emulsion polymerization or a micro-emulsion polymerization.

13. The method in accordance with claim 1, wherein said dispersion of an ion exchange fluorocarbon resin precursor and said dispersion of PTFE are both prepared by a suspension polymerization, an emulsion polymerization, a mini-emulsion polymerization or a micro-emulsion polymerization.

* * * * *